Jan. 1, 1935.  J. KENNEDY  1,986,206
HYDRAULIC VALVE
Filed Oct. 28, 1929  2 Sheets-Sheet 1
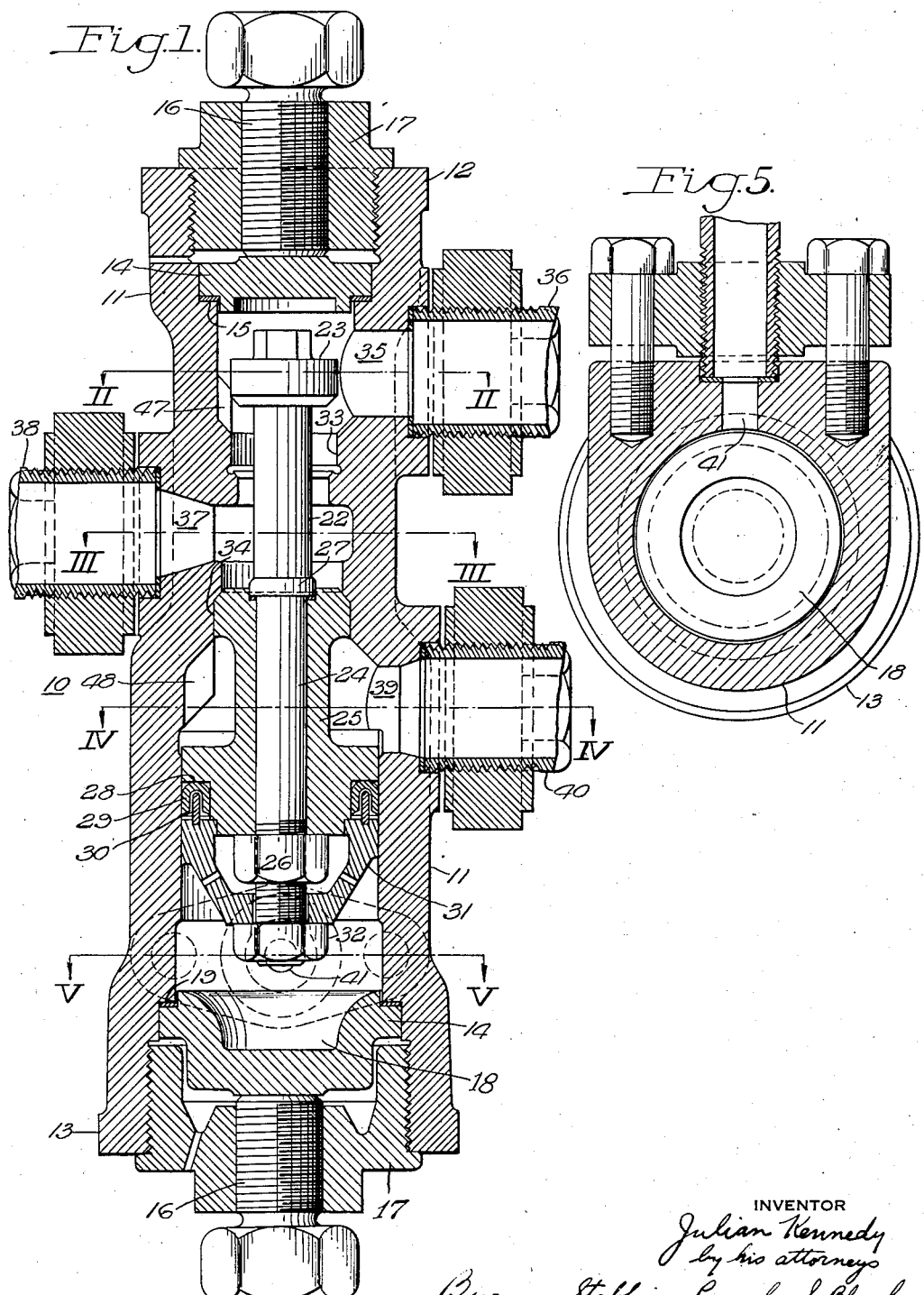
INVENTOR
Julian Kennedy
by his attorneys
Byrnes, Stebbins, Parmelee & Blenko Jan. 1, 1935.  J. KENNEDY  1,986,206
HYDRAULIC VALVE
Filed Oct. 28, 1929   2 Sheets-Sheet 2
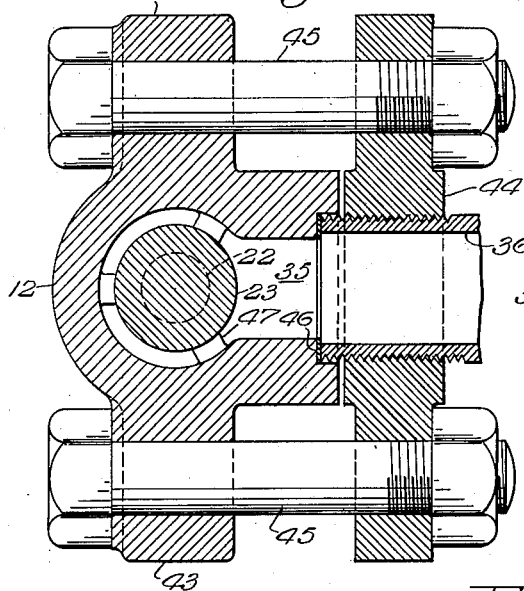
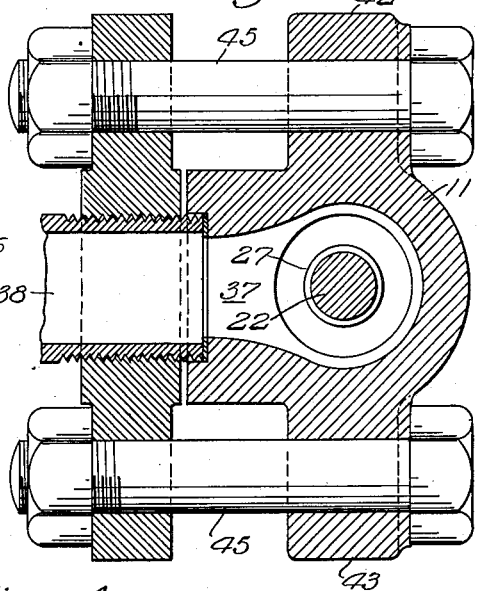
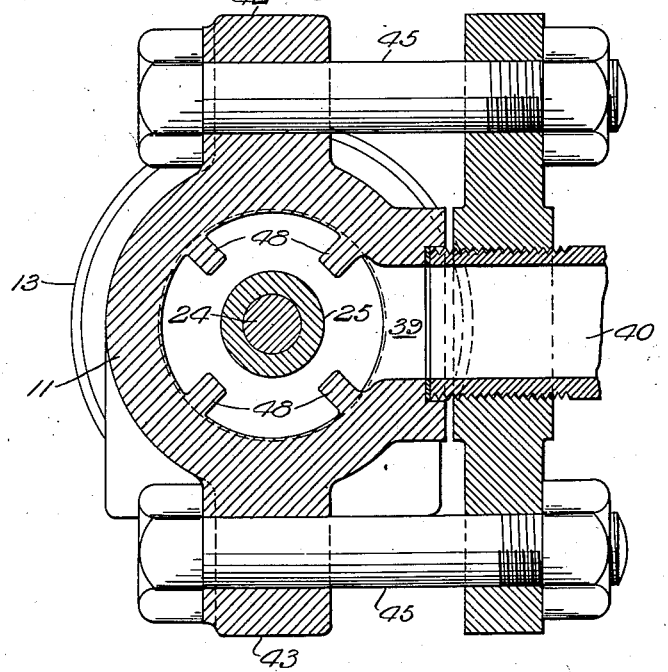
INVENTOR
Julian Kennedy
by his attorneys
Byrnes, Stebbins, Parmelee & Blenko Patented Jan. 1, 1935

1,986,206

UNITED STATES PATENT OFFICE 1,986,206

HYDRAULIC VALVE

Julian Kennedy, Pittsburgh, Pa.; Joseph Walker Kennedy, Julian Kennedy, Jr., Lucy Kennedy Miller, and Eliza Kennedy Smith, executors of said Julian Kennedy, deceased Application October 28, 1929, Serial No. 402,912

9 Claims. (Cl. 277—20)

My invention relates to valves and, in particular, to a hydraulic valve adapted for controlling the supply of fluid under pressure to a device operable by fluid pressure.

The valve of my invention finds an important field of usefulness in connection with the operation and control of blast furnace charging bells, although it is not limited thereto and has other useful applications which will be apparent to those skilled in the art.

My invention provides a valve having certain advantages over those heretofore used for controlling the flow of fluid under pressure and without certain objectionable features characteristic of prior devices. The details of a preferred embodiment of the device of my invention will be explained more fully in the following description referring to the accompanying drawings and the novel features will be specifically set forth in the appended claims.

In the drawings,

Figure 1 is a longitudinal section of my invention with parts shown in elevation;

Figures 2 to 5 are transverse sections through the device shown in Figure 1 along the planes of lines indicated by corresponding Roman numerals.

Referring in detail to the drawings, there is shown a valve 10 having a substantially cylindrical casing 11. The ends 12 and 13 of the casing are left open and are suitably threaded to receive closure means therefor. These closures comprise disks 14 seated against shoulders 15 and 19 in the ends of the cylinder 11. The disks are maintained in position by compression screws 16 threaded through plugs 17 threaded into the open ends of the cylinder. The lower disk 14 has a concave upper surface 18.

The operating mechanism of the valve comprises a valve stem 22 having an integral valve disk 23 formed thereon. The valve stem 22 has a reduced end portion 24 which is adapted to receive a valve piston 25. The reduced end 24 of the stem is threaded and a nut 26 is provided to secure the piston 25 in engagement with a collar 27 adjacent the end of the reduced portion 24.

The piston 25 is provided with an annular recess 28 adapted to receive a packing strip 29 which has a circular outline and a U-shaped cross section. The strip 29 is secured in position by a metallic ring 30 which, in turn, is engaged by a packing support 31. The support 31 is positioned axially of the stem 22 and is secured thereon by a nut 32.

The interior of the valve cylinder 11 is shaped to conform to the portions of the valve stem and valve piston engaged thereby. The valve disk 23 is adapted, when the valve stem is lowered, to engage a seat 33. The upper end of the piston 25, in the position illustrated, engages a seat 34. The arrangement of the disk 23 and the piston 25 is such that, when the stem moves downward, the disk 23 enters its seat 33 at least as soon as, and preferably before, the piston 25 moves entirely out of its seat 34.

In order to admit fluid under pressure for operating the valve 10 and the device or devices (not shown) controlled thereby, I provide a pressure inlet port 35 having a suitable supply conduit 36 connected thereto. A pressure outlet or delivery port 37 is provided to permit fluid under pressure to flow from the supply conduit 36, through the port 35, the upper gate of the valve constituted by the disk 23 and the seat 33, when the latter is open, through the outlet port 37 and a conduit 38 associated therewith to the device to be controlled by the fluid pressure.

A pressure relief outlet or drain port 39 having an associated conduit 40 is controlled by the piston 25. In the illustrated (pressure delivery) position of the piston, the outlet port 39 is cut off from the inlet port 35 and the outlet port 37. When the valve stem is actuated to its lower (pressure-relief) position in a manner to be described hereinafter, the inlet port 35 is first closed by the entry of the disk 23 into its seat 33. The pressure outlet port 37 is then connected to the pressure relief port 39 by the separation of the upper end of the piston 25 from its seat 34. The pressure utilized to operate the device under control is thus relieved and it is prepared for a subsequent cycle of operations.

When the valve stem 22 is in the position illustrated in Figure 1, and fluid under pressure is supplied to the conduit 36, the stem 22 will be moved to its lower position. This operation results because the area of the upper face of the disk 23 exposed to the downward force of the fluid pressure is greater than the area of the lower face of the disk subject to the upward force of the fluid pressure by the cross-sectional area of the stem 22. The fluid pressure also exerts a downward force on the upper surface of the piston 25 and thus assists in the movement of the valve stem. This movement, as explained hereinbefore, closes the connection between the pressure inlet 35 and the pressure outlet 37 and opens the connection between the latter and the pressure relief outlet 39. Thus, when fluid under pressure is applied to the inlet port 35, the valve operates to close the latter and open the pressure outlet port to the pressure relief port.

In order to maintain the valve stem in its upper position so that fluid under pressure may flow from the inlet port 35 through the outlet port 37 to the device under control, I provide a second pressure inlet or control port 41 for the purpose of admitting fluid under pressure to the lower surface of the piston 25. The area of this surface exposed to the upward force exerted by the fluid pressure is greater than the net area of the surfaces subject to the downward pressure of the fluid supplied through the inlet port 35, so that, when fluid under pressure is supplied to both the inlet port 35 and the inlet port 41, the valve stem is moved upward to establish a connection between the port 35 and the port 37.

In the upward movement of the stem, the converse of the operation described above takes place, namely, the pressure relief port 39 is closed before the pressure inlet port 35 is opened. This prevents the fluid supplied to the port 35 from passing directly out through the relief port 39. When the pressure applied to the lower face of the piston 25 is relieved by means of any suitable valve in the supply conduit connected to the inlet port 41, the valve stem moves downwardly to effect the results already set forth.

Since the valve 10 is designed for high pressure systems, it is important that all connections and joints be properly protected against leakage. In order to accomplish this result, I utilize suitable gaskets between the disks 14 and the adjacent shoulders 15 and 19. A gasket is also interposed between a recess in the upper face of the piston 25 and the collar 27 on the valve stem 22. The connections between the inlet and outlet ports and associated supply and discharge conduits are made leak-proof by the construction best illustrated in Figures 2 to 5. By referring especially to Figure 2, it will be seen that the upper end 12 of the valve cylinder 11 is provided with oppositely extending buttresses 42 and 43. A clamping collar 44 threaded on the end of the conduit 36 is secured to the valve cylinder by bolts 45 passing through suitable holes in the buttresses 42 and 43. The end of the conduit 36 is thus forced into engagement with a recess 46 in the inlet port 35 and a gasket between the recess and the end of the conduit affords a leak-proof connection therebetween. A similar construction is utilized to secure the remaining discharge and supply conduits to the valve cylinder.

The valve stem 22 is positioned centrally of the cylinder 11 by means of suitable guides 47 engaging the valve disk 23 and similar guides 48 engaging the upper end of the piston 25. These guides may best be observed in Figures 2 and 4, respectively.

It will be apparent from the foregoing description that the valve of my invention is characterized by great strength of construction, joints and connections which may be rendered leak-proof against very high pressures, and a design of great simplicity. The invention has a wide variety of applications and can be employed, generally speaking, wherever it is desired to control a device operated by fluid pressure. The control operation is, obviously, very simple, necessitating the application of fluid pressure to the inlet port 41 or the relief of pressure therefrom to accomplish a complete operating cycle. The inlet port 35 should have fluid pressure constantly applied thereto and the operation of the valve can then be effected by merely admitting fluid pressure to the port 41 or relieving it therefrom. This control may be effected by a single valve in the conduit connected to the port 41.

Although I have illustrated and described but a single present preferred embodiment of my invention, I do not intend to be limited to the specific details of construction set forth hereinabove, since the invention may be otherwise embodied within the scope of the appended claims without departing from the spirit thereof.

I claim:

1. A hydraulic valve having a casing, inlet ports adjacent the ends thereof, outlet and relief ports therebetween, a piston slidable in the casing, a valve disk actuated thereby, said disk and piston being effective in one position to connect an inlet port to the outlet port and to close said relief port, and in another position to cut off the casing from said last-mentioned inlet port and connect the outlet and relief ports, one end of the piston being of greater area than the other whereby, in response to fluid pressure on the smaller end only, it moves to the last-mentioned position, and, in response to equal unit pressure on both ends it moves to the first-mentioned position.

2. In a hydraulic valve, a casing having an inlet, an outlet and a relief port, a piston slidable in the casing and movable under pressure of fluid in the inlet, a valve disk movable with the piston and effective, on movement thereof due to pressure in the inlet, to close the latter and connect the outlet and the relief port, and a second inlet for applying opposing pressure to the piston to move it and the disk to open the first-mentioned inlet and close said relief port.

3. A control valve for hydraulic devices comprising a valve chamber, a delivery port and a drain port therein, a reciprocable piston valve in said chamber for establishing or preventing communication between said ports, a supply port for admitting fluid to the chamber, a valve operative to prevent communication between said supply and delivery ports on movement of the piston valve to connect the delivery and drain ports, the pressure of the fluid in the chamber tending to effect such movement of the piston valve, and means for applying pressure to the piston valve opposing movement thereof.

4. A control valve for hydraulic devices comprising a valve chamber, delivery and drain ports therein, a reciprocable piston valve in said chamber, normally biased by fluid pressure in said chamber to a position connecting the delivery and drain ports, a supply port for admitting fluid to said chamber, a valve disk effective in said position of the piston for cutting off the chamber from the supply port and responsive to pressure in said supply port for holding the piston in said position, and means for applying pressure to the piston tending to shift it to a position cutting off the drain port from the delivery port, said valve disk being moved by said shifting to open the supply port.

5. A valve comprising a chamber, supply, delivery and drain ports therein, a stem reciprocable in the chamber, a valve disk on the stem and a seat therefor between the supply and delivery ports, a piston on the stem, and a seat therefor forming a valve between the delivery and drain ports, said piston tending in response to pressure in said chamber, to shift so as to connect the delivery and drain ports and to move the stem so as to actuate the valve disk toward its seat to prevent communication between the supply and delivery ports.

6. A valve comprising a chamber, supply, delivery and drain ports therein, a stem reciprocable in the chamber, a valve disk on the stem and a seat therefor between the supply and delivery ports, a piston on the stem, a seat therefor forming a valve between the delivery and drain ports, said piston tending in response to pressure in said chamber, to shift so as to connect the delivery and drain ports and to move the stem so as to actuate the valve disk toward its seat to prevent communication between the supply and delivery ports, and means for supplying an opposing pressure to the piston to shift the stem whereby the valve disk is removed from its seat to connect the supply and delivery ports, and to prevent communication between the delivery and drain ports.

7. A valve comprising a casing, delivery and drain ports therein, a piston valve movable in the casing to a position connecting said ports, a supply port in the casing, a valve disk rigidly connected to said piston and effective to prevent communication between the supply and delivery ports when the piston is in such position as to connect the delivery and drain ports, said disk being subject to the pressure in said supply port and effective thereby to tend to move the piston to said last-mentioned position.

8. A hydraulic valve for controlling the delivery of fluid under pressure to an actuating mechanism and its relief therefrom comprising a casing, supply, delivery and relief ports therein, a piston valve in said casing having a disk valve controlling the supply port and operable therewith between pressure delivery and pressure relief positions, said piston being subject to the pressure in the supply port and tending to be moved thereby toward the pressure relief position, and means for applying an opposing force to the piston to overcome the effect of the pressure in the supply port.

9. A hydraulic valve comprising a casing, delivery and relief ports therein, a piston valve slidable in the casing for controlling said ports, a supply port in the casing, the pressure at the supply port tending to shift the piston valve, a valve actuated by shifting of said piston for preventing communication between the supply port and the delivery port, the movement of said piston being effective to establish communication between the delivery and relief ports, and means for supplying an opposing pressure to said piston to shift it so as to prevent communication between the delivery and relief ports and to establish communication between the supply and delivery ports.

JULIAN KENNEDY.